(12) United States Patent
Kern et al.

(10) Patent No.: US 8,166,072 B2
(45) Date of Patent: Apr. 24, 2012

(54) SYSTEM AND METHOD FOR NORMALIZING AND MERGING CREDENTIAL STORES

(75) Inventors: David Scott Kern, Billerica, MA (US); Richard Francis Annicchiarico, Nashua, NH (US); Nancy Ellen Kho, Belmont, MA (US); Robert John Paganetti, Scituate, MA (US)

(73) Assignee: International Business Machines Corporation, Armonk, NY (US)

( * ) Notice: Subject to any disclaimer, the term of this patent is extended or adjusted under 35 U.S.C. 154(b) by 348 days.

(21) Appl. No.: 12/425,860

(22) Filed: Apr. 17, 2009

(65) Prior Publication Data
US 2010/0268747 A1  Oct. 21, 2010

(51) Int. Cl.
G06F 17/30 (2006.01)
G06F 15/16 (2006.01)
(52) U.S. Cl. .................................... 707/786; 709/229
(58) Field of Classification Search .................. None
See application file for complete search history.

(56) References Cited

U.S. PATENT DOCUMENTS

| | | | |
|---|---|---|---|
| 5,774,551 A | 6/1998 | Wu et al. | |
| 6,615,253 B1 * | 9/2003 | Bowman-Amuah | 709/219 |
| 7,281,005 B2 * | 10/2007 | Canright et al. | 1/1 |
| 7,512,612 B1 * | 3/2009 | Akella et al. | 1/1 |
| 2003/0116630 A1 * | 6/2003 | Carey et al. | 235/462.09 |
| 2003/0182551 A1 | 9/2003 | Frantz et al. | |
| 2005/0289644 A1 | 12/2005 | Wray | |
| 2007/0255943 A1 | 11/2007 | Kern et al. | |
| 2007/0289001 A1 | 12/2007 | Havercan | |
| 2008/0059804 A1 | 3/2008 | Shah et al. | |
| 2008/0098067 A1 | 4/2008 | O'Sullivan et al. | |
| 2008/0235231 A1 * | 9/2008 | Gass et al. | 707/9 |
| 2010/0169343 A1 * | 7/2010 | Kenedy et al. | 707/758 |

FOREIGN PATENT DOCUMENTS

| | | |
|---|---|---|
| JP | 2005303993 | 10/2005 |
| WO | WO 2007059112 | 5/2007 |

* cited by examiner

Primary Examiner — Rehana Perveen
Assistant Examiner — Arshia S Kia
(74) Attorney, Agent, or Firm — Holland & Knight LLP; Brian J Colandreo, Esq.; Mia K. Fiedler

(57) ABSTRACT

One or more data structures are received by a computing device, wherein the one or more data structures include at least one or more user credentials. The one or more user credentials are normalized by the computing device to generate a first graph. One or more nodes of the first graph and one or more nodes of at least a second graph are analyzed by the computing device, wherein analyzing includes at least identifying a logical correlation between the one or more nodes of the first graph and the one or more nodes of at least the second graph. A third graph is generated by the computing device based, at least in part, upon the analysis of the one or more nodes of the first graph and the one or more nodes of at least the second graph. An output data structure is generated by the computing device based, at least in part, upon the third graph.

22 Claims, 8 Drawing Sheets

SYSTEM AND METHOD FOR NORMALIZING AND MERGING CREDENTIAL STORES

TECHNICAL FIELD

This disclosure relates to credential stores and, more particularly, to a method of normalizing and merging credential stores in various formats.

BACKGROUND

Conventional credential store systems generally allow users to store user credentials in a centralized manner, such as on a server, which may be accessed and/or downloaded to the computing device on which they are utilizing. Typically, these systems may also provide users with the ability to, e.g., synchronize passwords between various systems and/or log into multiple systems utilizing a single password. Often, conventional credential store systems may store a large volume of information that may relate to disparate authentication mechanisms and services. Storage of such information is frequently performed in chronological order as corresponding features are added or improved, despite being logically distinct. This may lead to a condition where multiple copies of a credential store on various computing systems may become desynchronized and result in an inconsistent user experience and/or unexpected security behavior. It may often be useful for a credential store system to provide a more robust and logical approach to managing user credentials across various computing systems.

SUMMARY OF DISCLOSURE

According to a first implementation, a computer-implemented method includes receiving, by a computing device, one or more data structures, wherein the one or more data structures include at least one or more user credentials. The one or more user credentials are normalized by the computing device to generate a first graph. One or more nodes of the first graph and one or more nodes of at least a second graph are analyzed by the computing device, wherein analyzing includes at least identifying a logical correlation between the one or more nodes of the first graph and the one or more nodes of at least the second graph. A third graph is generated by the computing device based, at least in part, upon the analysis of the one or more nodes of the first graph and the one or more nodes of at least the second graph. An output data structure is generated by the computing device based, at least in part, upon the third graph.

One or more of the following features may be included. The output data structure may be transmitted by the computing device to a client computer. The graph may be an n-dimensional sparse matrix. Normalizing the one or more user credentials may include generating one of the one or more nodes based, at least in part, upon one of the one or more user credentials. The one or more nodes may be arranged by logical level into one or more rows of the n-dimensional sparse matrix. Identifying the logical correlation between the one or more nodes of the first graph and the one or more nodes of at least the second graph may include comparing a functionality of the one or more nodes of the first graph and one or more nodes of at least the second graph. The one or more nodes may include subnodes.

Generation of the third graph based, at least in part, upon the analysis of the one or more nodes of the first graph and the one or more nodes of at least the second graph may include generating one or more nodes and subnodes of the third graph based, at least in part, upon one of the one or more nodes and subnodes of the first graph and the one or more nodes and subnodes of at least the second graph. The one or more user credentials may include one or more of a username, a public key, a private key, a certificate, a creation indicator, an expiration indicator, and a modification indicator. The computing device may be a server computer.

According to another implementation, a computer program product includes a computer readable medium having a plurality of instructions stored on it. When executed by a processor, the instructions cause the processor to perform operations including receiving, by a computing device, one or more data structures, wherein the one or more data structures include at least one or more user credentials. The one or more user credentials are normalized, by the computing device, to generate a first graph. One or more nodes of the first graph and one or more nodes of at least a second graph are analyzed, by the computing device, wherein analyzing includes at least identifying a logical correlation between the one or more nodes of the first graph and the one or more nodes of at least the second graph. A third graph is generated by the computing device based, at least in part, upon the analysis of the one or more nodes of the first graph and the one or more nodes of at least the second graph. An output data structure is generated by the computing device based, at least in part, upon the third graph.

One or more of the following features may be included. The output data structure may be transmitted by the computing device to a client computer. The graph may be an n-dimensional sparse matrix. Normalizing the one or more user credentials may include generating one of the one or more nodes based, at least in part, upon one of the one or more user credentials. The one or more nodes may be arranged by logical level into one or more rows of the n-dimensional sparse matrix. Identifying the logical correlation between the one or more nodes of the first graph and the one or more nodes of at least the second graph may include comparing a functionality of the one or more nodes of the first graph and one or more nodes of at least the second graph. The one or more nodes may include subnodes.

Generation of the third graph based, at least in part, upon the analysis of the one or more nodes of the first graph and the one or more nodes of at least the second graph may include generating one or more nodes and subnodes of the third graph based, at least in part, upon one of the one or more nodes and subnodes of the first graph and the one or more nodes and subnodes of at least the second graph. The one or more user credentials may include one or more of a username, a public key, a private key, a certificate, a creation indicator, an expiration indicator, and a modification indicator.

According to yet another implementation, a computing system includes a processor and a memory module coupled with the processor. A first software module is executable by the processor and the memory module. The first software module is configured to receive one or more data structures, wherein the one or more data structures include at least one or more user credentials. A second software module is executable by the processor and the memory module. The second software module is configured to normalize the one or more user credentials to generate a first graph. A third software module is executable by the processor and the memory module. The third software module is configured to analyze one or more nodes of the first graph and one or more nodes of at least a second graph, wherein analyzing includes at least identifying a logical correlation between the one or more nodes of the first graph and the one or more nodes of at least the second graph. A fourth software module is executable by the processor and the memory module. The fourth software module is configured to generate a third graph based, at least in part, upon the analysis of the one or more nodes of the first graph and the one or more nodes of at least the second graph. A fifth software module is executable by the processor and the memory module. The fifth software module is configured to generate an output data structure based, at least in part, upon the third graph.

One or more of the following features may be included. A sixth software module may be executable by the processor and the memory module. The sixth software module may be configured to transmit the output data structure to a client computer. The graph may be an n-dimensional sparse matrix. The second software module configured to normalize the one or more user credentials may be further configured to generate one of the one or more nodes based, at least in part, one of the one or more user credentials. The one or more nodes may be arranged by logical level into one or more rows of the n-dimensional sparse matrix. Identifying the logical correlation between the one or more nodes of the first graph and the one or more nodes of at least the second graph may include comparing a functionality of the one or more nodes of the first graph and one or more nodes of at least the second graph. The one or more nodes may include subnodes.

The fourth software module configured to generate the third graph may be further configured to generate one or more nodes and subnodes of the third graph based, at least in part, upon one of the one or more nodes and subnodes of the first graph and the one or more nodes and subnodes of at least the second graph. The one or more user credentials may include one or more of a username, a public key, a private key, a certificate, a creation indicator, an expiration indicator, and a modification indicator.

The details of one or more implementations are set forth in the accompanying drawings and the description below. Other features and advantages will become apparent from the description, the drawings, and the claims.

DETAILED DESCRIPTION OF EXEMPLARY EMBODIMENTS

Figure 1:
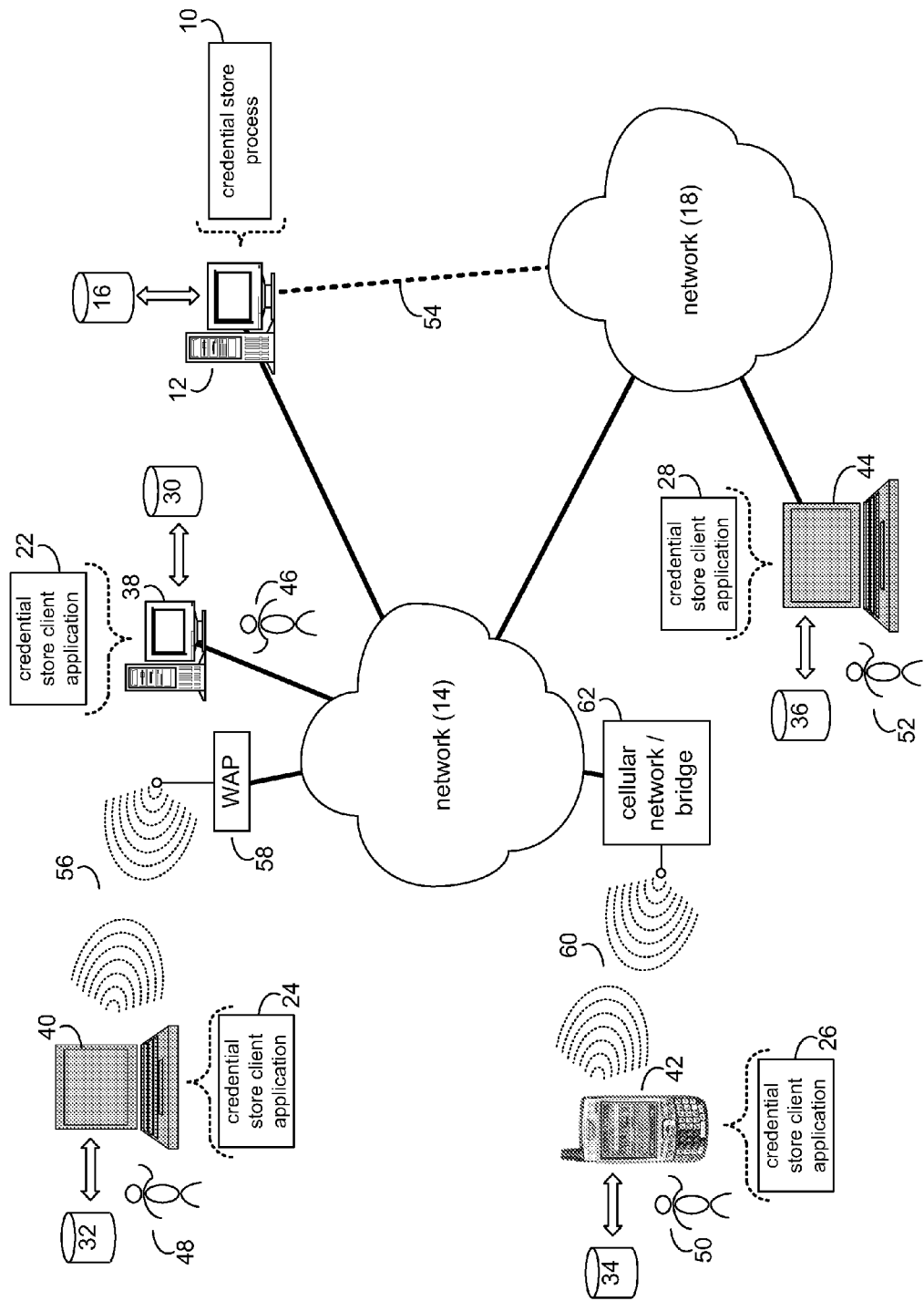
FIG. 1 diagrammatically depicts a credential store process coupled to a distributed computing system.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown credential store process 10 that may reside on and may be executed by server computer 12, which may be connected to network 14 (e.g., the Internet or a local area network). Examples of server computer 12 may include, but are not limited to: a personal computer, a handheld computer (e.g., a PDA), a server computer, a series of server computers, a mini computer, and a mainframe computer. Server computer 12 may be a web server (or a series of servers) running a network operating system, examples of which may include but are not limited to: Microsoft® Windows® Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both). Network 14 may be connected to one or more secondary networks (e.g., network 18), examples of which may include but are not limited to: a local area network; a wide area network; or an intranet, for example.

As will be discussed below in greater detail, credential store process 10 may receive one or more data structures, wherein the one or more data structures may include at least one or more user credentials. Credential store process 10 may normalize the one or more user credentials may to generate a first graph. Further, credential store process 10 may analyze one or more nodes of the first graph and one or more nodes of at least a second graph, wherein analyzing may include at least identifying a logical correlation between the one or more nodes of the first graph and the one or more nodes of at least the second graph. A third graph may also be generated credential store process 10 based, at least in part, upon the analysis of the one or more nodes of the first graph and the one or more nodes of at least the second graph. Finally, credential store process 10 may generate an output data structure based, at least in part, upon the third graph.

The instruction sets and subroutines of credential store process 10, which may be configured as one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive; a tape drive; an optical drive; a RAID array; a random access memory (RAM); and a read-only memory (ROM).

For the purpose of the following description, server computer 12 may be discussed. However, this is for illustrative purposes only and should not be construed as a limitation of the present disclosure, as one of skill in the art will appreciate that any computing device capable of performing the functions of credential store process 10 may be utilized.

The instruction sets and subroutines of credential store client applications 22, 24, 26, 28, which may be configured as one or more software modules, and which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives; tape drives; optical drives; RAID arrays; random access memories (RAM); read-only memories (ROM), compact flash (CF) storage devices, secure digital (SD) storage devices, and memory stick storage devices. Examples of computing devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using credential store client applications 22, 24, 26, 28, users 46, 48, 50, 52 may, for example, merge and/or synchronize multiple credential stores.

Users 46, 48, 50, 52 may access credential store process 10 directly through the device on which the client application (e.g., credential store client applications 22, 24, 26, 28) is executed, namely client electronic devices 38, 40, 42, 44, for example. Users 46, 48, 50, 52 may access credential store process 10 directly through network 14 or through secondary network 18. Further, server computer 12 (i.e., the computer that executes credential store process 10) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft® Windows®, Microsoft Windows CE®, Red Hat® Linux®, or a custom operating system (Windows CE is a registered trademark of Microsoft Corporation in the United States, other countries, or both).

For the purpose of the following description, credential store client application 22 may be discussed. However, this is for illustrative purposes only and should not be construed as a limitation of the present disclosure, as other client applications (e.g., credential store client applications 24, 26, 28) may be equally utilized. Additionally, while the following description may recite the terms "nodes" and "subnodes," the terms may be used interchangeably (e.g., the term "node" may include one or more "subnodes"). Further, "nodes" and "subnodes" may include data itself, or may include links (e.g., pointers) to, e.g., a subordinate node in a graph that contains the desired data.

Figure 2:
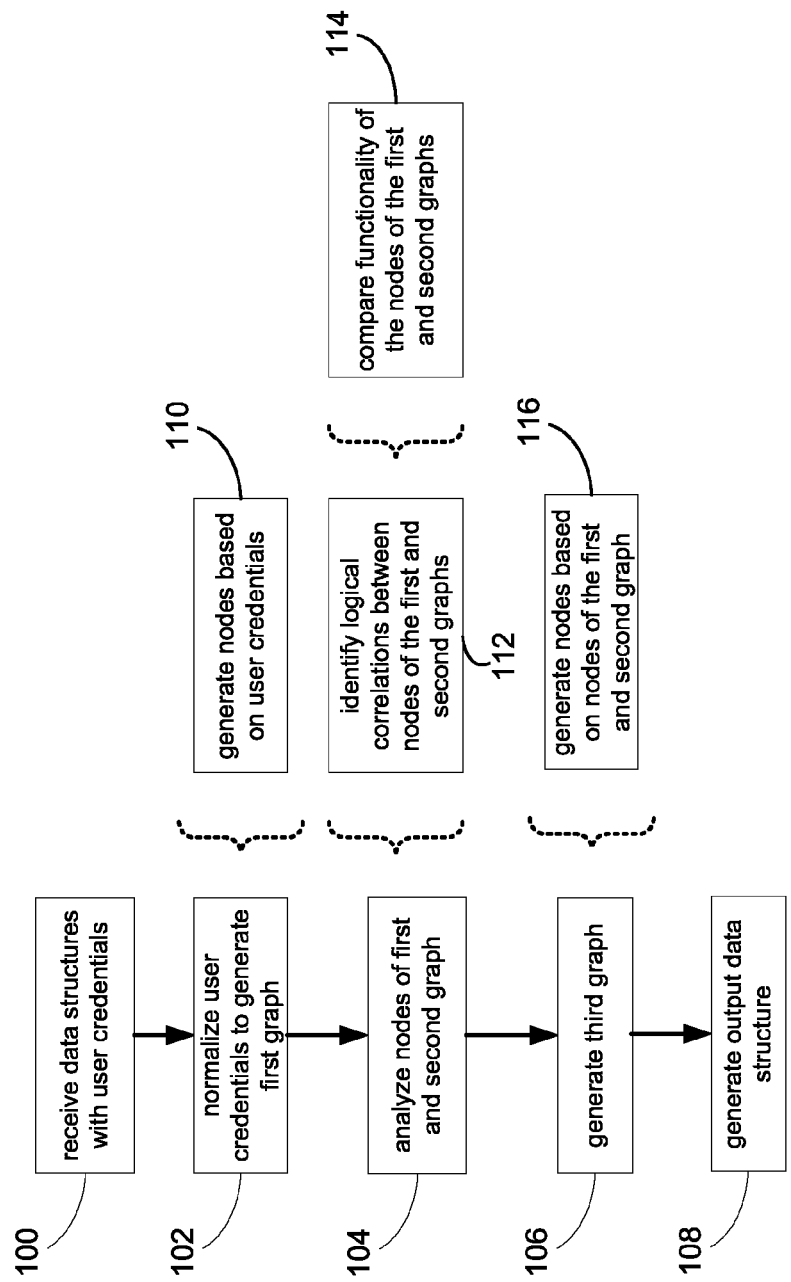
FIG. 2 is a flow chart of a process performed by the credential store process of FIG. 1.

Referring also to FIG. 2, credential store process 10 may receive 100 (via, e.g., server computer 12) one or more data structures, wherein the one or more data structures may include at least one or more user credentials. Credential store process 10 may also normalize 102 the one or more user credentials to generate a first graph. Credential store process 10 may further analyze 104 one or more nodes of the first graph and one or more nodes of at least a second graph, wherein analyzing may include at least identifying a logical correlation between the one or more nodes of the first graph and the one or more nodes of at least the second graph. Additionally, a third graph may be generated 106 by credential store process 10 based, at least in part, upon the analysis of the one or more nodes of the first graph and the one or more nodes of at least the second graph. Finally, credential store process 10 may generate 108 an output data structure based, at least in part, upon the third graph.

Figure 3:
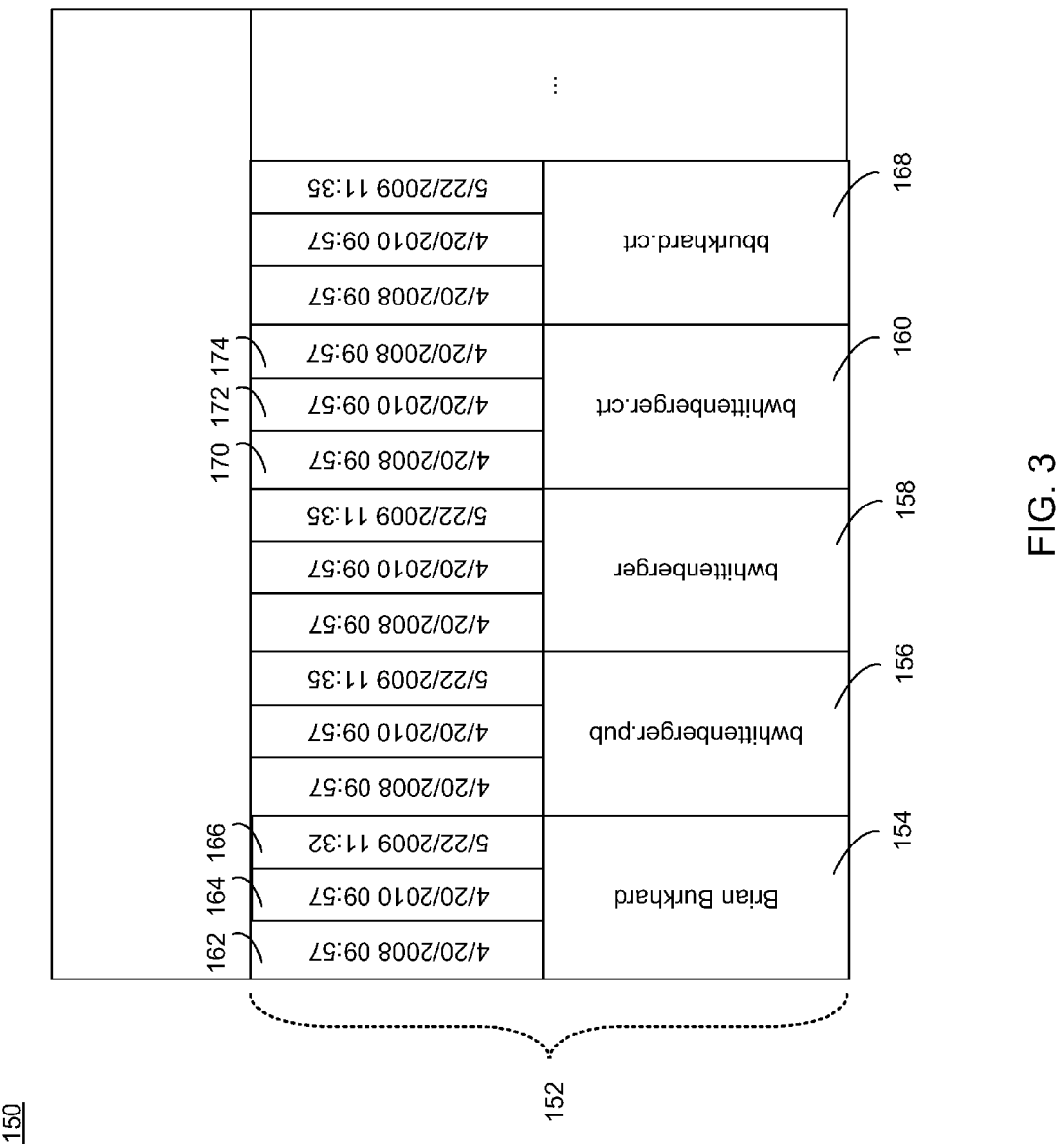
FIG. 3 diagrammatically depicts a data structure that may be utilized by the credential store process of FIG. 1.

Referring also to FIG. 3, credential store process 10 may receive 100 (via a computing device, e.g., server computer 12) one or more data structures (e.g., data structure 150), wherein the one or more data structures may include at least one or more user credentials 152. The one or more user credentials 152 may include one or more of a username 154, a public key 156, a private key 158, a certificate (e.g., certificate 160/168), creation indicators (e.g., username creation indicator 162, certificate creation indicator 170), expiration indicators (e.g., username expiration indicator 164, certificate expiration indicator 172), and modification indicators (e.g., username modification indicator 166, certificate modification indicator 174), as well as various additional/alternative user credentials.

One of skill in the art will appreciate that the number, nature, and organization of the one or more user credentials 152 within data structure 150 may vary depending on programming/design requirements. As such, username 154, public key 156, private key 158, certificate 160, username creation indicator 162, username expiration indicator 164, username modification indicator 166, certificate 168, certificate creation indicator 170, certificate expiration indicator 172, and certificate modification indicator 174 are merely illustrative and are not intended to impart any limitation on the number or nature of user credentials 152 that may be included within data structure 150. For example, other user credentials may include, but are not limited to: usernames (i.e., distinct from username 154) applicable to different computing systems (e.g., other than client electronic device 38, 40, 42, 44; not shown); passwords (i.e., distinct from a password for use with e.g., username 154) applicable to different computing systems (e.g., other than client electronic device 38, 40, 42, 44; not shown); user identifiers that may not be a username (e.g., username 154; not shown); and secret keys (not shown).

Moreover, the organization of user credentials 152 is not intended to be a limitation of this disclosure. For example, while private key 158 may be a unique user credential 152 (as depicted in FIG. 3), it may also be embodied within any other logically related user credential 152 (e.g., certificate 160).

Illustratively, a user (e.g., user 46) utilizing client electronic device 38 may, via credential store client application 22, update one of its user credentials 152 (e.g., username 154) within data structure 150 (e.g., a credential store) that is stored on, e.g., storage device 30 of client electronic device 38. The updated data structure 150 may be transmitted from client electronic device 38 to server computer 12, thereby enabling credential store process 10 to receive 100 the updated data structure 150. One of skill in the art will appreciate that an updated user credential 152 (e.g., username 154) may be transmitted to, e.g., server computer 12 as part of an updated data structure 150 (which may contain other, non-updated, user credentials 152), or individually.

Figure 4:
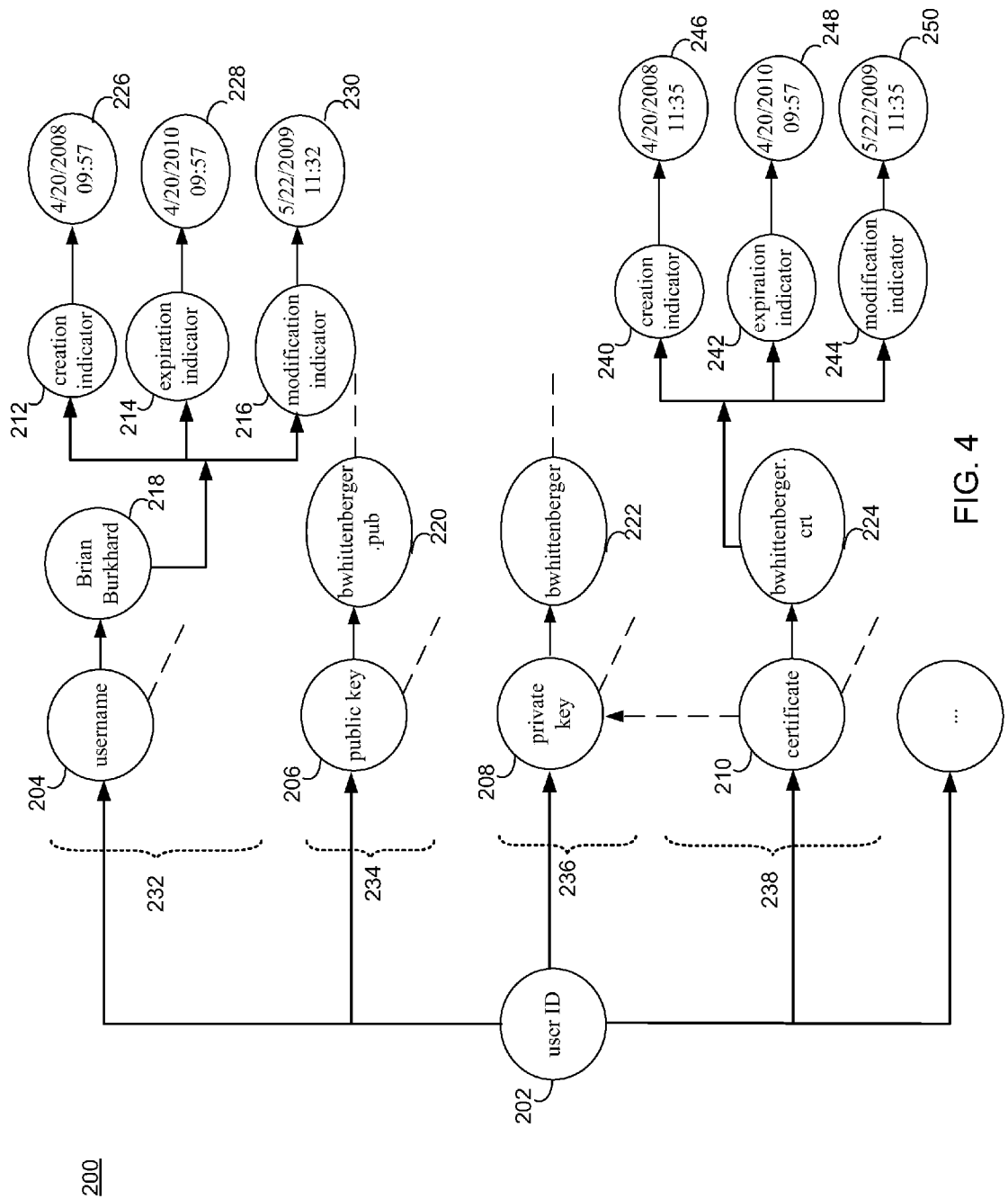
FIG. 4 diagrammatically depicts a graph generated by the credential store process of FIG. 1.

Referring also to FIG. 4, credential store process 10 may normalize 102 the one or more user credentials 152 to generate a first graph 200 (which, e.g., may be an n-dimensional sparse matrix, as will be described in greater detail below). Normalizing 102 the one or more user credentials 152 may include generating 110 one of the one or more nodes (which may include subnodes) based, at least in part, upon one of the one or more user credentials 152 (e.g., username 154, public key 156, private key 158, certificate 160, username creation indicator 162, username expiration indicator 164, username modification indicator 166, certificate 168, certificate creation indicator 170, certificate expiration indicator 172, and certificate modification indicator 174).

As will be described in greater detail below, the one or more nodes and subnodes (e.g., root node 202, username parent node 204, public key parent node 206, private key parent node 208, certificate parent node 210, username creation indicator parent node 212, username expiration indicator parent node 214, username modification indicator parent node 216, username data subnode 218, public key data subnode 220, private key data subnode 222, and certificate data subnode 224) may be arranged by logical level into one or more rows (e.g., username row 232, public key row 234, private key row 236, and certificate row 238) of the n-dimensional sparse matrix (e.g., first graph 200). Accordingly, arranging the one or more nodes and subnodes by logical level may be performed based on the functionality of each set or type of user credentials (e.g., user credentials 152).

For clarity of explanation, various nodes and subnodes may not have been depicted in the drawings, as they may be repetitive of previously-described nodes or subnodes. However, and as may be denoted by dashed lines in the drawings, this is not intended to be a limitation of this disclosure. For example, nodes and subnodes generated 110 based (at least in part) upon user credentials 152 may include indicator subnodes including, but not limited to: certificate creation indicator parent node 240, certificate expiration indicator parent node 242, and certificate modification indicator parent node 244 (as well as their respective data subnodes; e.g., certificate creation indicator data subnode 246, certificate expiration indicator data subnode 248, and certificate modification indicator data subnode 250). Similarly, additional data subnodes (e.g., subordinate to a "parent" node of a logical level/row) may be included. For example, a user may have multiple certificates that each may be subordinate to, e.g., certificate parent node 210.

Illustratively, and continuing with the above-stated example, credential store process 10 may normalize 102 username 154 of user 46 by generating 110 username data subnode 218 of first graph 200 based on the data embodied within username 154 (i.e., "Brian Burkhard"), as updated, of data structure 150. As mentioned above, the one or more nodes and subnodes of, e.g., first graph 200 may be arranged by logical level into one or more rows. Accordingly, usernames data subnode 218 may be arranged into a row (e.g., username row 232) of first graph 200 that pertains to the functionality of storing a user's name. Additionally, username parent node 204 may link (e.g., via a pointer) to usernames data subnode 218.

Similarly, credential store process 10 may normalize 102 each of user 46's remaining user credentials 152 to complete the generation of first graph 200. For example, public key data node 220 may be generated 110 based on the data embodied within public key 156 of data structure 150, which may be arranged into a row (e.g., public key row 234) of first graph 200 that pertains to the functionality of storing a user's public key. Credential store process 10 may repeat this normalization 102 process until a sufficient number of nodes and subnodes of first graph 200 have been generated 110 to arrange all (or a portion thereof) of the user credentials 152 of, e.g., user 46 into logical levels within first graph 200.

One of skill in the art will appreciate that arranging nodes based on the functionality of each set or type of user credential, as opposed to the structure in which those user credentials are represented on a storage medium, may enables merge logic (as will be discussed in greater detail below) to be generated and maintained based on functional areas. This may further be based, at least in part, upon the implementation of graphs as n-dimensional sparse matrices. As is known in the art, a sparse matrix may be a matrix populated primarily with default values (typically zeros). This may be useful in systems, such as the present disclosure, which may have multiple values with varying degrees of interconnection.

Additionally, credential store process 10 may also generate 110 a root node (e.g., root node 202) to which all other nodes and subnodes may be subordinate. This may be performed to create a single point of association to other nodes and subnodes. However, one of skill in the art will understand that this is not a limitation of this disclosure, as other means of association of nodes and subnodes may be created.

Figure 5:
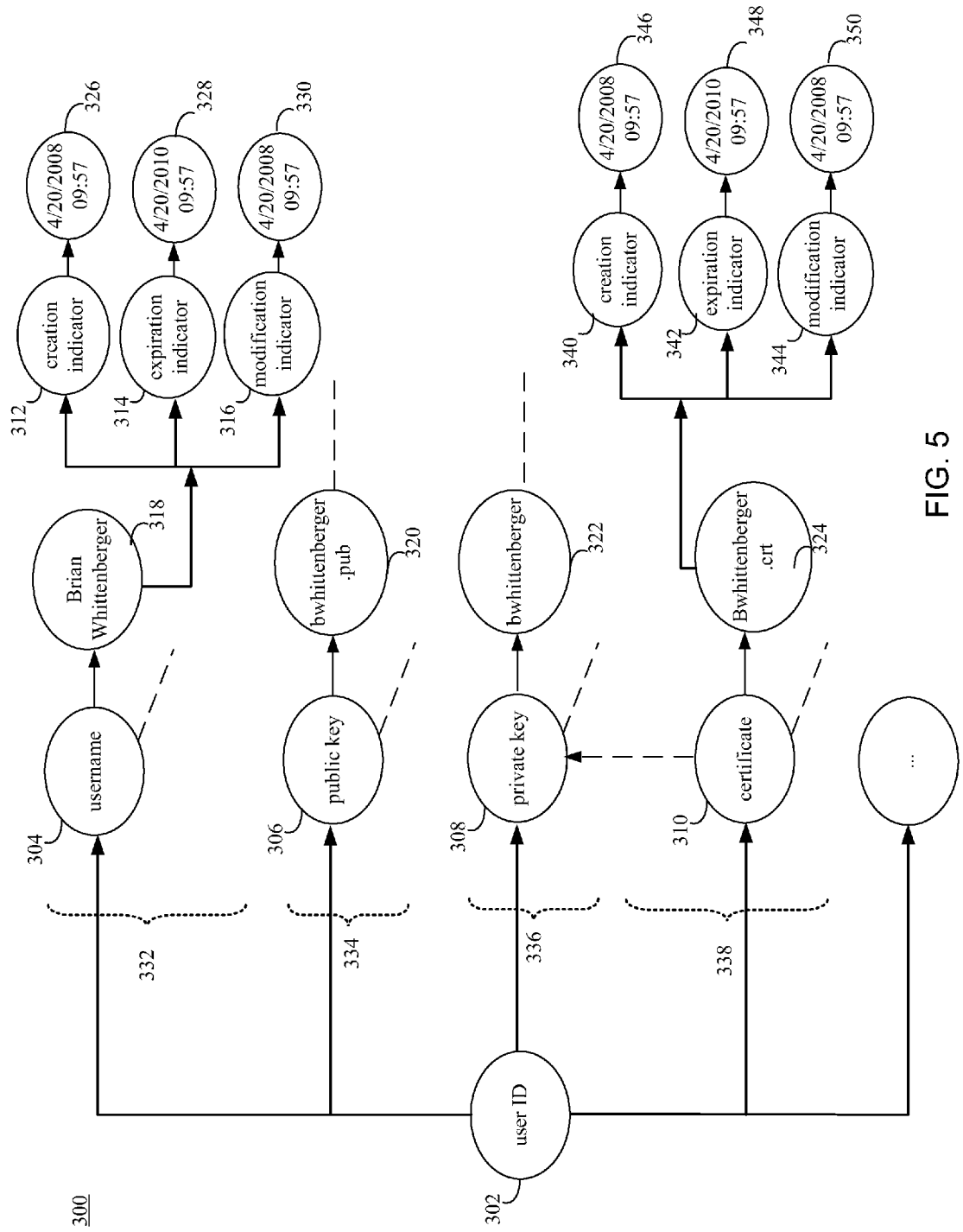
FIG. 5 diagrammatically depicts a graph generated by the credential store process of FIG. 1.
Figure 6:
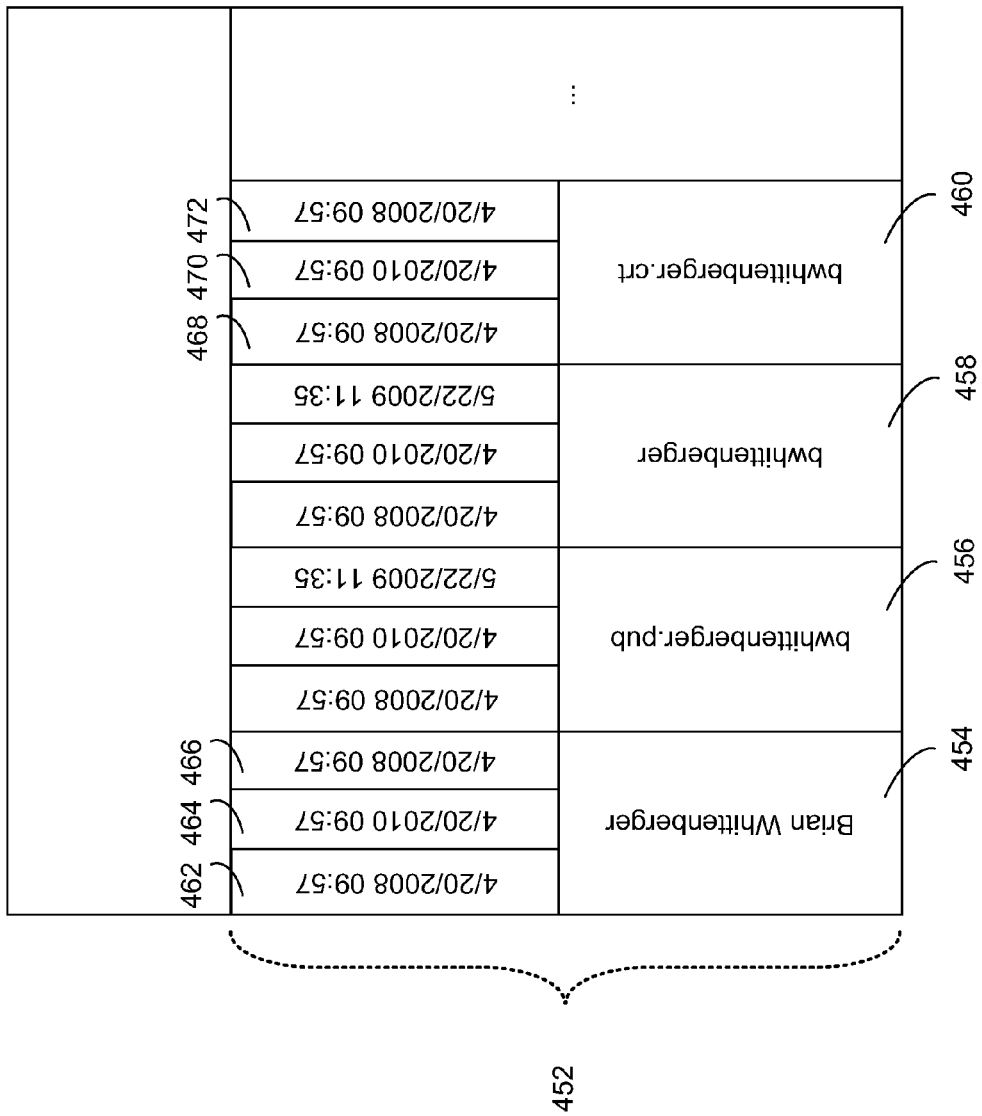
FIG. 6 diagrammatically depicts a data structure that may be utilized by the credential store process of FIG. 1.

Referring also to FIGS. 5 & 6, credential store process 10 may further analyze 104 one or more nodes of first graph 200 and one or more nodes of at least second graph 300, wherein analyzing 104 may include at least identifying 112 a logical correlation between the one or more nodes of first graph 200 and the one or more nodes of at least second graph 300. Second graph 300 may have previously been stored on, e.g., storage device 16 of server computer 12. Additionally/alternatively, second graph 300 may have been previously stored on a separate storage device (e.g., storage device 30, 32, 34, 36) and transmitted to credential store process 10 for analysis 104.

However, this is not to be construed as a limitation of this disclosure, as second graph 300 may not have been previously stored on a storage device (e.g., storage device 16, 30, 32, 34, 36). One of skill in the art will understand that a second data structure (e.g., data structure 450) may have previously been stored on a storage device (e.g., storage device 16, 30, 32, 34, 36). Credential store process 10 may then receive 100 and normalize 102 data structure 450 to generate second graph 300. Additionally, if credential store process 10 normalized 102 data structure 450, credential store process 10 may also generate 110 one of the one or more nodes (which may include subnodes) of data structure 450 based, at least in part, upon one of the one or more user credentials 452. For clarity of explanation, the present disclosure illustratively assumes that second graph 300 was not stored on a storage device (e.g., storage device 16, 30, 32, 34, 36), and that credential store process 10 generated second graph 300 by normalizing 102 data structure 450 (e.g., stored on storage device 16).

For example, and similar to data structure 150 (described above), data structure 450 may include one or more user credentials 452 (e.g., username 454, public key 456, private key 458, certificate 460, username creation indicator 462, username expiration indicator 464, username modification indicator 466, certificate creation indicator 468, certificate expiration indicator 470, and certificate modification indicator 472). During the normalization 102 process, credential store process 10 may generate 110 one of the one or more nodes (which may include subnodes) of second graph 300 based, at least in part, upon one of the one or more user credentials 452.

The nodes and subnodes of the resulting second graph 300 (e.g., root node 302, username parent node 304, public key parent node 306, private key parent node 308, certificate parent node 310, username creation indicator parent node 312, username expiration indicator parent node 314, modification indicator parent node 316, username data subnode 318, public key data subnode 320, private key data subnode 322, certificate data subnode 324, username creation indicator data subnode 326, username expiration indicator data subnode 328, and username modification indicator data subnode 330) may be arranged by logical level into one or more rows (e.g., username row 332, public key row 334, private key row 336, and certificate row 338) of second graph 300. Accordingly, and similar to first graph 200, arranging the one or more nodes and subnodes by logical level may be performed based on the functionality of each set or type of user credentials (e.g., user credentials 452).

As discussed above, and for clarity of explanation, various nodes and subnodes may not have been depicted in the drawings, as they may be repetitive of previously-described nodes or subnodes. However, and as may be denoted by dashed lines in the drawings, this is not intended to be a limitation of this disclosure. For example, nodes and subnodes generated 110 based (at least in part) upon user credentials 452 may include indicator subnodes including, but not limited to: certificate creation indicator parent node 340, certificate expiration indicator parent node 342, and certificate modification indicator parent node 344 (as well as their respective data subnodes; e.g., certificate creation indicator data subnode 346, certificate expiration indicator data subnode 348, and certificate modification indicator data subnode 350). Similarly, additional data subnodes (e.g., subordinate to a "parent" node of a logical level/row) may be included. For example, a user may have multiple certificates that each may be subordinate to, e.g., certificate parent node 310 (as denoted by the dashed line in the drawing).

Illustratively, and continuing with the above-stated example (in which data structure 150 represents an updated version of user credentials 152 for user 46), credential store process 10 may normalize 102 username 454 of user 46 by generating 110 username data subnode 318 of second graph 300 based on the data embodied within username 454 (i.e., "Brian Whittenberger") of data structure 450. As mentioned above, the one or more nodes and subnodes of, e.g., second graph 300 may be arranged by logical level into one or more rows. Accordingly, username data subnode 318 may be arranged into a row (e.g., username row 332) of second graph 300 that pertains to the functionality of storing a user's name.

Similarly, credential store process 10 may normalize 102 each of user 46's remaining user credentials 452 to complete the generation of second graph 300. For example, public key data node 320 may be generated 110 based on the data embodied within public key 456 of data structure 450, which may be arranged into a row (e.g., public key row 334) of second graph 300 that pertains to the functionality of storing a user's public key. Credential store process 10 may repeat this normalization 102 process until a sufficient number of nodes and subnodes of second graph 300 have been generated 110 to arrange all (or a portion thereof) of the user credentials 452 of, e.g., user 46 into logical levels (i.e., rows) within second graph 300.

The analysis 104, by credential store process 10, of one or more nodes of first graph 200 and one or more nodes of second graph 300 to identify 112 a logical correlation between the respective nodes may include comparing 114 a functionality of the one or more nodes of first graph 200 and one or more nodes of at least second graph 300. As discussed above, when credential store process 10 normalizes 102 user credentials (e.g., user credentials 152, 452) into one or more nodes and subnodes of a graph (e.g., first graph 200, second graph 300), the user credentials may be arranged into rows based on their logical level (e.g., functionality). Consequently, credential store process 10 may identify 112 one or more nodes and subnodes of, e.g., first graph 200 that have a logical correlation to one or more nodes and subnodes of, e.g., second graph 300.

Illustratively, and continuing the above-stated example, user 46 may have recently changed its name (e.g., due to marriage), and thus, may utilize credential store client application 22 to update username 154 of data structure 150 while interacting with, e.g., client electronic device 38. Credential store client applications (e.g., credential store client application 22) may be platform-specific applications that are capable of interfacing with/parsing the credential store format utilized by specific platforms. As a consequence, credential store client applications may identify the function to which a particular user credential 152 (e.g., username 154, public key 156, private key 158, certificate 160, username creation indicator 162, username expiration indicator 164, username modification indicator 166, certificate 168, certificate creation indicator 170, certificate expiration indicator 172, and certificate modification indicator 174) may pertain, and may indicate such in its respective data structure (e.g., data structure 150). During normalization 102, such indication may enable credential store process 10 to generate 110 nodes and subnodes that may be organized by functional areas.

By way of example, credential store client application 22 may indicate that the updated username 154 pertains to the function of storing a user's name. Based on such indication, credential store process 10 may generate 110 username parent node 204 as a "parent" or "root" node for subnodes that contain username data. Further, credential store process 10 may generate 110 username data subnode 218, based on the data embodied within username 154, as a subordinate node to username parent node 204. This exemplary process may result in first graph 200 including a row of nodes pertaining to the functionality of storing user's names (e.g., username row 232).

However, this example is not to be construed as a limitation of this disclosure, as a user (e.g., user 46) may not affirmatively utilize a credential store client application (e.g., credential store client application 22) to update a user credential (e.g., username 154). For example, credential store client application 22 may detect and propagate changes/updates to user credentials without affirmative action by a user. Additionally, any number of other processes (e.g., credential store process 10) may identify and indicate the function to which a particular user credential (e.g., user credentials 154) may pertain. For example, credential store process 10 may receive 100 data structure 150 and subsequently perform such identification and indication of user credentials.

After receiving 100 the updated data structure 150 (or, as explained above, username 154 individually), and normalizing 102 data structure 150 and data structure 450 to generate first graph 200 and second graph 300 (respectively), credential store process 10 may identify 112 username data subnode 218 of first graph 200 and username data subnode 318 of second graph 300 as being logically correlated by, e.g., comparing 114 the functionality of username data subnode 218 and username data subnode 318. Illustratively, credential store process 10 may accomplish this by accessing username parent node 204 of first graph 200 and username parent node 304 of second graph 300. Credential store process 10 may then identify 112 the logical correlation between username data subnode 218 and username data subnode 318 by comparing 114 the functionality of those user credentials' respective parent nodes (i.e., username parent node 204/304). As a result of username data subnode 218 and username data subnode 318 being subordinate to logically correlated parent nodes (i.e., username parent node 204/304), credential store process 10 may begin the process of merging the updated username data (e.g., by generation of a third graph).

Figure 7:
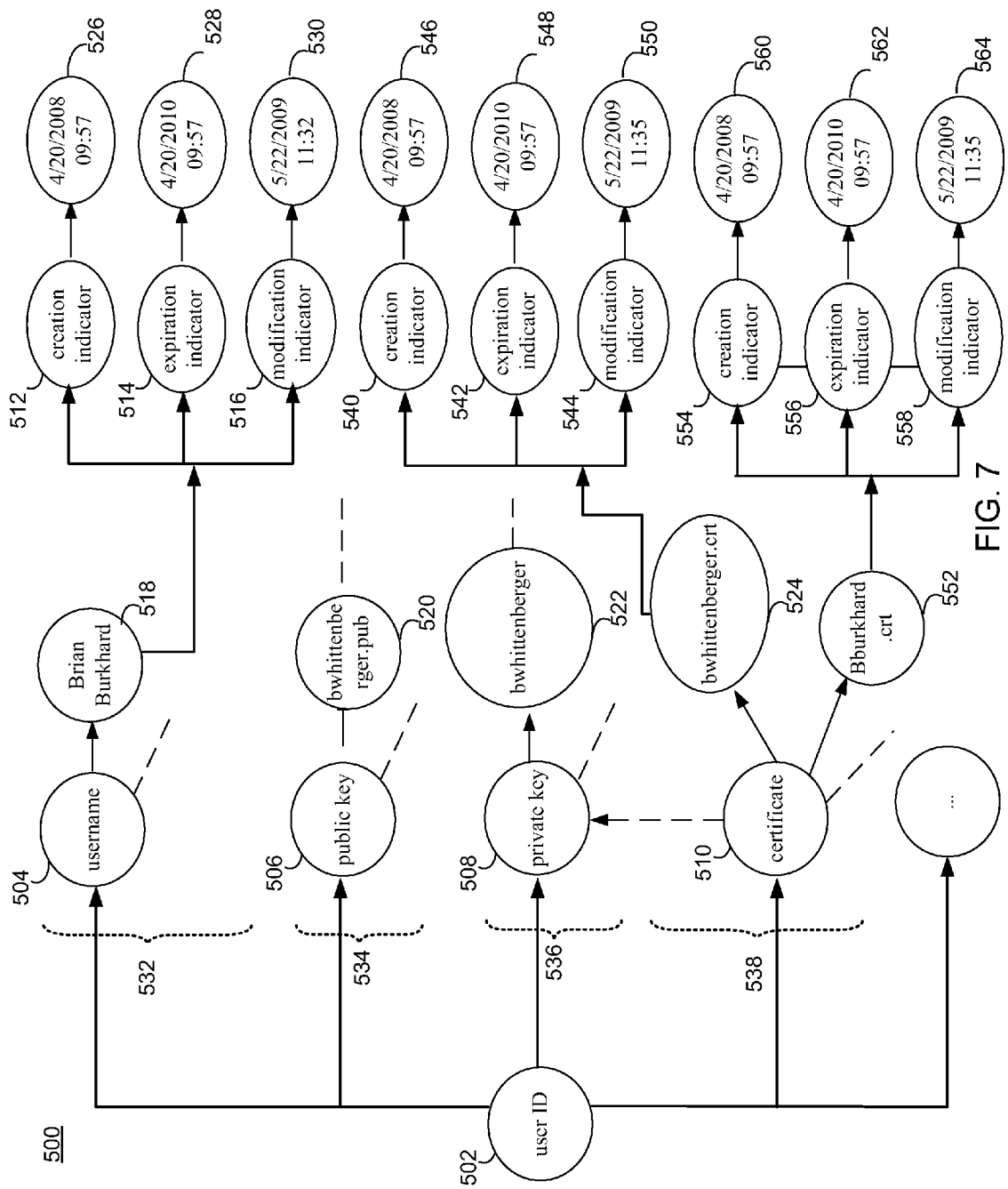
FIG. 7 diagrammatically depicts a graph generated by the credential store process of FIG. 1.

Referring also to FIG. 7, third graph 500 may be generated 106 by credential store process 10 based, at least in part, upon the analysis 104 of the one or more nodes of first graph 200 and the one or more nodes of at least second graph 300. This may include generating 116 one or more nodes and subnodes of third graph 500 based, at least in part, upon one of the one or more nodes and subnodes of first graph 200 and the one or more nodes and subnodes of at least second graph 300.

Generation 116 of the nodes and subnodes of third graph 500 may vary depending on the functional area (e.g., logical level) of the nodes being analyzed 104. For example, and as will be described in greater detail below, after identifying 112 the logical correlation between username data subnode 218 and username data subnode 318, credential store process 10 may generate 116 nodes and/or subnodes in third graph 500 based on the most recently modified node (i.e., username data subnode 218). Quite differently, and with respect to a logical correlation between certificate data subnode 224 and certificate data subnode 324, credential store process 10 may generate 116 nodes and/or subnodes in third graph 500 based on, e.g., a combination of the most recently modified node and whether an indication (e.g., a "LOCAL" flag) existed that may require the certificate data subnode to remain unchanged.

Regarding the exemplary situation of a username change by user 46, credential store process 10 may generate 116 one or more nodes and subnodes of third graph 500 by first identifying 112 nodes that may be logically correlated due to, e.g., sharing the function of storing usernames. In the instant example, and as described above, credential store process 10 may compare 114 the functionality of username parent node 204 and username parent node 304 (i.e., the "parent" nodes of username data subnode 218 and username data subnode 318, respectively) to determine that they may be of the same logical level. Credential store process 10 may then compare the indicator subnodes (e.g., username modification indicator data subnode 230/330) of each username data subnode (e.g., username data subnode 218/318, respectively) to determine which of user 46's usernames may have been most recently modified.

The determination of such by credential store process 10 may include first identifying 112 nodes that may be logically correlated due to, e.g., sharing the function of storing modification data that pertains to a username. In the instant example, credential store process 10 may compare 114 the functionality of username modification indicator parent node 216 and username modification indicator parent node 316 (i.e., the "parent" nodes of username modification indicator data subnode 230 and username modification indicator data subnode 330, respectively) to determine that they may be of the same logical level. Credential store process 10 may then compare the data embodied by username modification indicator data subnode 230 (i.e., "May 22, 2009 11:32") and username modification indicator data subnode 330 (i.e., "Apr. 20, 2008 09:57"), which may indicate that username data subnode 218 may have been modified most recently.

Based on the exemplary determination that username data subnode 218 was most recently modified, credential store process 10 may generate 116 nodes and subnodes of third graph 500 by copying all of the nodes and subnodes of first graph 200 that may be subordinate to username parent node 204 (i.e., username row 232, which may also be referred to as a "subgraph"). As depicted in FIG. 7, the resulting subordinate nodes and subnodes may include, but are not limited to: username data subnode 518 (i.e., embodying the updated username data "Brian Burkhard"), username creation indicator parent node 512, username expiration indicator parent node 514, username modification indicator parent node 516, username creation indicator data subnode 526, username expiration indicator data subnode 528, and username modification indicator data subnode 530.

As will be appreciated by one of skill in the art, a process, such as the one described by the present disclosure, capable of copying an entire subgraph (as opposed to, e.g., analyzing all nodes in a particular subgraph to make a determination relative to each node) may yield a substantial increase in system performance. This is not to be construed as a limitation of this disclosure, however, as credential store process 10 may analyze 104 each node and subnode of a particular graph(s) when generating 116 nodes of a third graph (e.g., third graph 500).

For the purposes of the following explanation, and in addition to the above-discussed username change of user 46, it may be assumed that the username change also necessitated the generation of a new certificate (e.g., certificate 168) for user 46. Further, it may be assumed that credential store client application 22 generated certificate 168 locally (e.g., on client electronic device 38). Accordingly, data structure 150 may include certificate 168 (and, optionally, certificate 160) as well as corresponding indicator sub-fields (e.g., certificate creation indicator 170, certificate expiration indicator 172, and certificate modification indicator 174).

Additionally, it may be assumed that the platform executed by client electronic device 38 may have credential store requirements that may be specific to that platform. For example, the credential store (e.g., data structure 150) for user 46 on client electronic device 38 may be encrypted with a password combined with a salt. As is known in the art, a salt may comprise random bits that are used as one of the inputs to a key derivation function. The other input may usually be a password. The output of the key derivation function may be stored as the encrypted version of the password. Further assuming that credential store process 10 enables user 46 to utilize the same password when utilizing any client electronic device (e.g., client electronic device 38, 40, 42, 44), it may not be desirable to propagate the output of the key derivation function (i.e., user 46's combined password and salt) to all of the nodes and subnodes of third graph 500 that logically correlate to a user's password.

As mentioned above, credential store client application 22 may indicate (e.g., via a "LOCAL" flag) that certificate 168 may contain data (e.g., the password) that may be specific to a particular platform. However, this is not to be construed as a limitation of this disclosure, as credential store client application 22 may indicate that only the password of certificate 168 may be specific to a particular platform. For example, certificate 168 (i.e., of data structure 150) may include a sub-field (e.g., a password sub-field; not shown) that credential store client application 22 may indicate as being specific to a particular platform, rather than indicating certificate 168.

Upon detecting this "LOCAL" flag (as opposed to a "REMOTE" flag, which may be utilized to denote certain non-platform specific data that may, e.g., reside on storage device 16 of server computer 12), credential store process 10 may generate 116 one or more nodes and subnodes in third graph 500 without analyzing 104 nodes of other graphs (e.g., second graph 300). For example, credential store process 10 may generate 116 one or more nodes and subnodes in third graph 500 including, but not limited to: certificate data subnode 552 (i.e., embodying the data of certificate 168), certificate creation indicator parent node 554, certificate expiration indicator parent node 556, certificate modification indicator parent node 558, certificate creation indicator data subnode 560, certificate expiration indicator data subnode 562, and certificate modification indicator data subnode 564.

As stated above, data structure 150 may optionally continue to include certificate 160. If it does so, credential store process 10 may also compare 114 the functionality of certificate parent node 210 and certificate parent node 310 (i.e., the "parent" nodes of certificate data subnode 224 and certificate data subnode 324, respectively) to determine that they may be of the same logical level. Credential store process 10 may then compare the data embodied by certificate modification indicator data subnode 250 (i.e., "May 22, 2009 11:35") and certificate modification indicator data subnode 350 (i.e., "Apr. 20, 2008 09:57"), which indicates that certificate data subnode 224 may have been modified most recently.

Based on the exemplary determination that certificate data subnode 224 was most recently modified, credential store process 10 may generate 116 nodes and subnodes of third graph 500 by copying all of the nodes and subnodes of first graph 200 that may be subordinate to certificate parent node 210 (which, as stated above, may also be referred to as a "subgraph"). This may result in credential store process 10 generating 116 one or more nodes and subnodes in third graph 500 including, but not limited to: certificate creation indicator parent node 540, certificate expiration indicator parent node 542, certificate modification indicator parent node 544, certificate creation indicator data subnode 546, certificate expiration indicator data subnode 548, and certificate modification indicator data subnode 550.

Utilizing the above-described procedures (e.g., receiving 100, normalizing 102, analyzing 104), credential store process 10 may further generate 116 the remainder of the nodes and subnodes of third graph 500 (e.g., root node 502, username parent node 504, public key parent node 506, private key parent node 508, certificate parent node 510, username creation indicator parent node 512, username expiration indicator parent node 514, modification indicator parent node 516, username data subnode 518, public key data subnode 520, private key data subnode 522, certificate data subnode 524, username creation indicator data subnode 526, username expiration indicator data subnode 528, and username modification indicator data subnode 530). Additionally, and similar to first graph 200 and second graph 300, the nodes and subnodes of third graph 500 may be arranged by logical level (e.g., the functionality of each set or type of user credentials) into one or more rows (e.g., username row 532, public key row 534, private key row 536, and certificate row 538).

Additionally, credential store process 10, when attempting to analyze 104 and/or identify 112 one or more nodes and subnodes from, e.g., first graph 200 and second graph 300, may not be able to locate a node in one graph that logically corresponds to a node in the other. Due the normalized order in which credential store process 10 may create one or more nodes in a graph, credential store process 10 may be able to identify such lack of a logically corresponding node. For example, first graph 200 may have a node and/or subnodes (not shown) embodying the user credential 152 of, e.g., a birthdate (not shown) that may not be present in second graph 300. Accordingly, credential store process 10 may generate 106 one or more nodes and subnodes in third graph 500 embodying the birthdate user credential by copying all of the nodes and subnodes of first graph 200 that may be subordinate to the birthdate parent node (which, as discussed above, may also be referred to as a "subgraph"; not shown).

Figure 8:
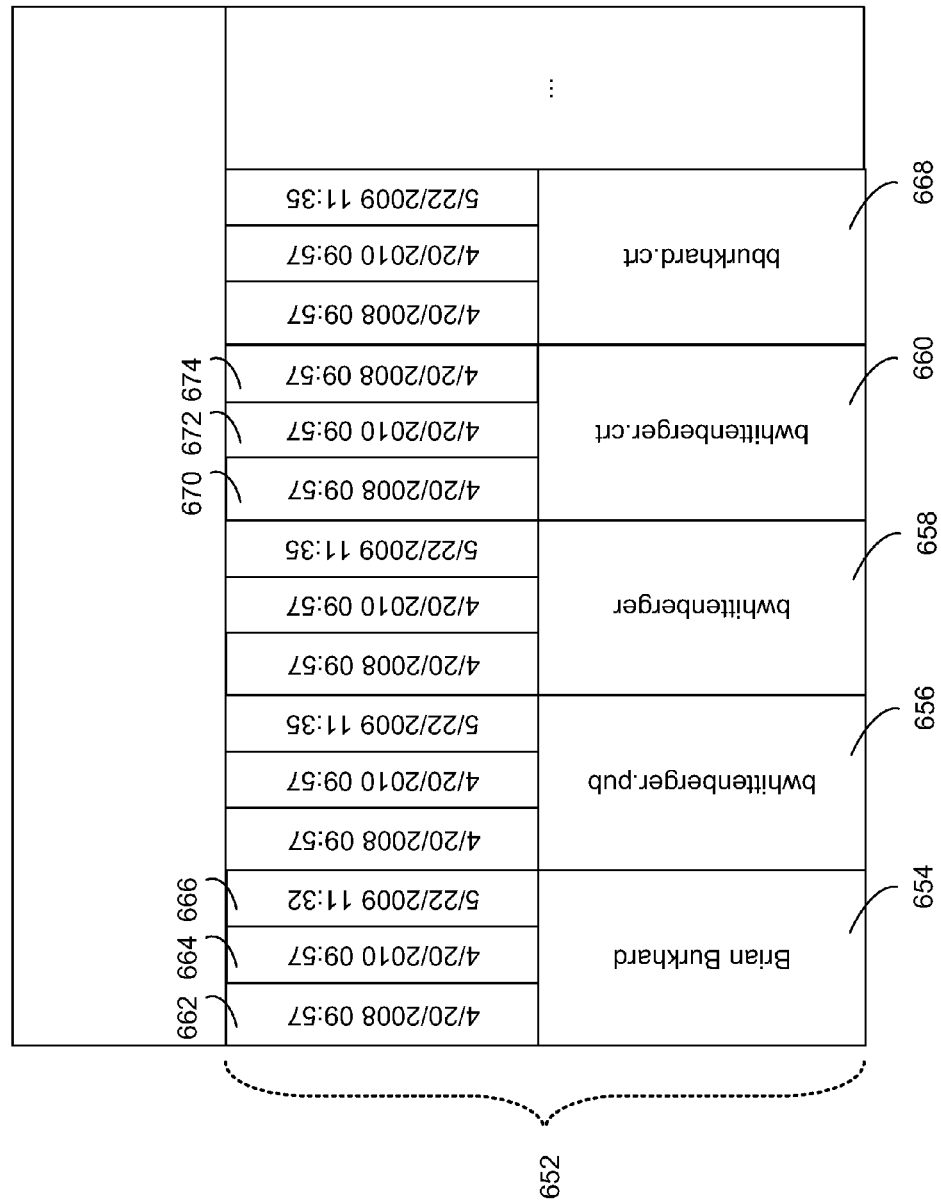
FIG. 8 diagrammatically depicts a data structure that may be generated by the credential store process of FIG. 1.

Referring also to FIG. 8, credential store process 10 may generate 108 output data structure 650 based, at least in part, upon third graph 500. Utilizing the logically arranged structure of third graph 500, credential store process 10 may analyze each node and subnode to generate 108 output data structure 650, which may be generated 108 in a format that may be interpreted by the client computer (e.g., client electronic device 40) to which it may be destined.

This is not to be construed as a limitation of this disclosure, however, as output data structure 650 may be generated 108 in other formats. For example, credential store process 10 may generate 108 output data structure 650 in a format that may be stored on, e.g., storage device 16 of server computer 12, such that output data structure 650 may be subsequently processed (in a manner as described supra) by credential store process 10.

When credential store process 10 analyzes third graph 500, it may analyze each logical level/row (e.g., username row 532, public key row 534, private key row 536, and certificate row 538), generating 108 each of the one or more user credentials (e.g., user credentials 652) of output data structure 650 as it "walks" down each row (e.g., utilizing pointers from each node to the next; a process known to one of skill in the art).

For example, credential store process 10 may generate 108 username 654, including its corresponding indicators (e.g., username creation indicator 662, username expiration indicator 664, and username modification indicator 666), by first locating username parent node 504. Thereafter, credential store process 10 may analyze each node and subnode depending thereupon to generate 108 all of the data that may comprise username 654.

Similarly, credential store process 10 may generate 108 the remainder of user credentials 652, which may include, but are not limited to: username 654, public key 656, private key 658, certificate 660 (optionally, as described above), certificate 668, creation indicators (e.g., username creation indicator 662, certificate creation indicator 670), expiration indicators (e.g., username expiration indicator 664, certificate expiration indicator 672), and modification indicators (e.g., username modification indicator 666, certificate modification indicator 674).

Additionally, and returning to the above-stated example regarding the platform-specific nature of client electronic device 38, it may not be necessary for credential store process 10 to generate 108 certificate 660 or its corresponding indicators (e.g., certificate creation indicator 670, certificate expiration indicator 672, and certificate modification indicator 674), as credential store client application 22 may only require the newly created certificate (i.e., certificate 668).

Upon generation 108, output data structure 650 may be transmitted by the computing device (e.g., server computer 12) to a client computer (e.g., client electronic device 38, 40, 42, 44). As discussed above, output data structure 650 may be generated in a format (e.g., platform-specific format) that the receiving client electronic device may be able to interpret.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer-implemented method comprising:
receiving, by a computing device including a processor, one or more data structures from a second computing device, wherein the one or more data structures include at least one or more user credentials;

normalizing, by the computing device, the one or more user credentials of the one or more data structures received from the second computing device to generate a first graph;

normalizing, by the computing device, one or more user credentials of one or more data structures from a storage device to generate a second graph;

analyzing, by the computing device, one or more nodes of the first graph and one or more nodes of at least the second graph, wherein analyzing includes at least identifying a logical correlation between the one or more nodes of the first graph and the one or more nodes of at least the second graph;

generating, by the computing device, a third graph based, at least in part, upon the analysis of the one or more nodes of the first graph and the one or more nodes of at least the second graph;

generating, by the computing device, an output data structure based, at least in part, upon the third graph; and transmitting, by the computing device, the output data structure to the second computing device.

2. The computer-implemented method of claim 1 wherein the first graph is an n-dimensional sparse matrix.

3. The computer-implemented method of claim 2 wherein normalizing the one or more user credentials received from the second computing device includes:

generating one of the one or more nodes based, at least in part, upon one of the one or more user credentials received from the second computing device; and arranging the one or more nodes, by logical level, into one or more rows of the n-dimensional sparse matrix.

4. The computer-implemented method of claim 3 wherein identifying the logical correlation between the one or more nodes of the first graph and the one or more nodes of at least the second graph includes comparing a functionality of the one or more nodes of the first graph and one or more nodes of at least the second graph.

5. The computer-implemented method of claim 3 wherein the one or more nodes include subnodes.

6. The computer-implemented method of claim 5 wherein generating the third graph based, at least in part, upon the analysis of the one or more nodes of the first graph and the one or more nodes of at least the second graph includes:

generating one or more nodes and subnodes of the third graph based, at least in part, upon one of the one or more nodes and subnodes of the first graph and the one or more nodes and subnodes of at least the second graph.

7. The computer-implemented method of claim 1 wherein the one or more user credentials includes one or more of a username, a public key, a private key, a certificate, a creation indicator, an expiration indicator, and a modification indicator.

8. The computer-implemented method of claim 1 wherein the computing device is a server computer.

9. A computer program product residing on a computer readable storage medium having a plurality of instructions stored thereon which, when executed by a processor, cause the processor to perform operations comprising:

receiving, by a computing device, one or more data structures from a second computing device, wherein the one or more data structures include at least one or more user credentials;

normalizing, by the computing device, the one or more user credentials to generate a first graph;

normalizing, by the computing device, one or more user credentials of one or more data structures from a storage device to generate a second graph;

analyzing, by the computing device, one or more nodes of the first graph and one or more nodes of at least the second graph, wherein analyzing includes at least identifying a logical correlation between the one or more nodes of the first graph and the one or more nodes of at least the second graph;

generating, by the computing device, a third graph based, at least in part, upon the analysis of the one or more nodes of the first graph and the one or more nodes of at least the second graph;

generating, by the computing device, an output data structure based, at least in part, upon the third graph; and transmitting, by the computing device, the output data structure to the second computing device.

10. The computer program product of claim 9 wherein the first graph is an n-dimensional sparse matrix.

11. The computer program product of claim 10 wherein the instructions for normalizing the one or more user credentials received from the second computing device include:

generating one of the one or more nodes based, at least in part, upon one of the one or more user credentials received from the second computing device; and arranging the one or more nodes, by logical level, into one or more rows of the n-dimensional sparse matrix.

12. The computer program product of claim 11 wherein the instructions for identifying the logical correlation between the one or more nodes of the first graph and the one or more nodes of at least the second graph include comparing a functionality of the one or more nodes of the first graph and one or more nodes of at least the second graph.

13. The computer program product of claim 11 wherein the one or more nodes include subnodes.

14. The computer program product of claim 13 wherein the instructions for generating the third graph based, at least in part, upon the analysis of the one or more nodes of the first graph and the one or more nodes of at least the second graph include:

generating one or more nodes and subnodes of the third graph based, at least in part, upon one of the one or more nodes and subnodes of the first graph and the one or more nodes and subnodes of at least the second graph.

15. The computer program product of claim 9 wherein the one or more user credentials includes one or more of a username, a public key, a private key, a certificate, a creation indicator, an expiration indicator, and a modification indicator.

16. A computing system comprising:

a processor;

a memory module coupled with the processor;

a first software module executable by the processor and the memory module, wherein the first software module is configured to receive one or more data structures from a computing device, wherein the one or more data structures include at least one or more user credentials;

a second software module executable by the processor and the memory module, wherein the second software module is configured to normalize the one or more user credentials of the one or more data structures received from the computing device to generate a first graph;

a third software module executable by the processor and the memory module, wherein the third software module is configured to normalize one or more user credentials of one or more data structures from a storage device to generate a second graph;

a fourth software module executable by the processor and the memory module, wherein the fourth software module is configured to analyze one or more nodes of the first graph and one or more nodes of at least the second graph, wherein analyzing includes at least identifying a logical correlation between the one or more nodes of the first graph and the one or more nodes of at least the second graph;

a fifth software module executable by the processor and the memory module, wherein the fifth software module is configured to generate a third graph based, at least in part, upon the analysis of the one or more nodes of the first graph and the one or more nodes of at least the second graph;

a sixth software module executable by the processor and the memory module, wherein the sixth software module is configured to generate an output data structure based, at least in part, upon the third graph; and a seventh software module executable by the processor and the memory module, wherein the seventh software module is configured to transmit the output data structure to the computing device.

17. The computing system of claim 16 wherein the first graph is an n-dimensional sparse matrix.

18. The computing system of claim 17 wherein the second software module configured to normalize the one or more user credentials received from the computing device is further configured to:

generate one of the one or more nodes based, at least in part, upon one of the one or more user credentials received from the computing device; and arrange the one or more nodes, by logical level, into one or more rows of the n-dimensional sparse matrix.

19. The computing system of claim 18 wherein identifying the logical correlation between the one or more nodes of the first graph and the one or more nodes of at least the second graph includes comparing a functionality of the one or more nodes of the first graph and one or more nodes of at least the second graph.

20. The computing system of claim 18 wherein the one or more nodes include subnodes.

21. The computing system of claim 20 wherein the fourth software module configured to generate the third graph is further configured to:

generate one or more nodes and subnodes of the third graph based, at least in part, upon one of the one or more nodes and subnodes of the first graph and the one or more nodes and subnodes of at least the second graph.

22. The computing system of claim 16 wherein the one or more user credentials includes one or more of a username, a public key, a private key, a certificate, a creation indicator, an expiration indicator, and a modification indicator.

* * * * *